Figure 1:
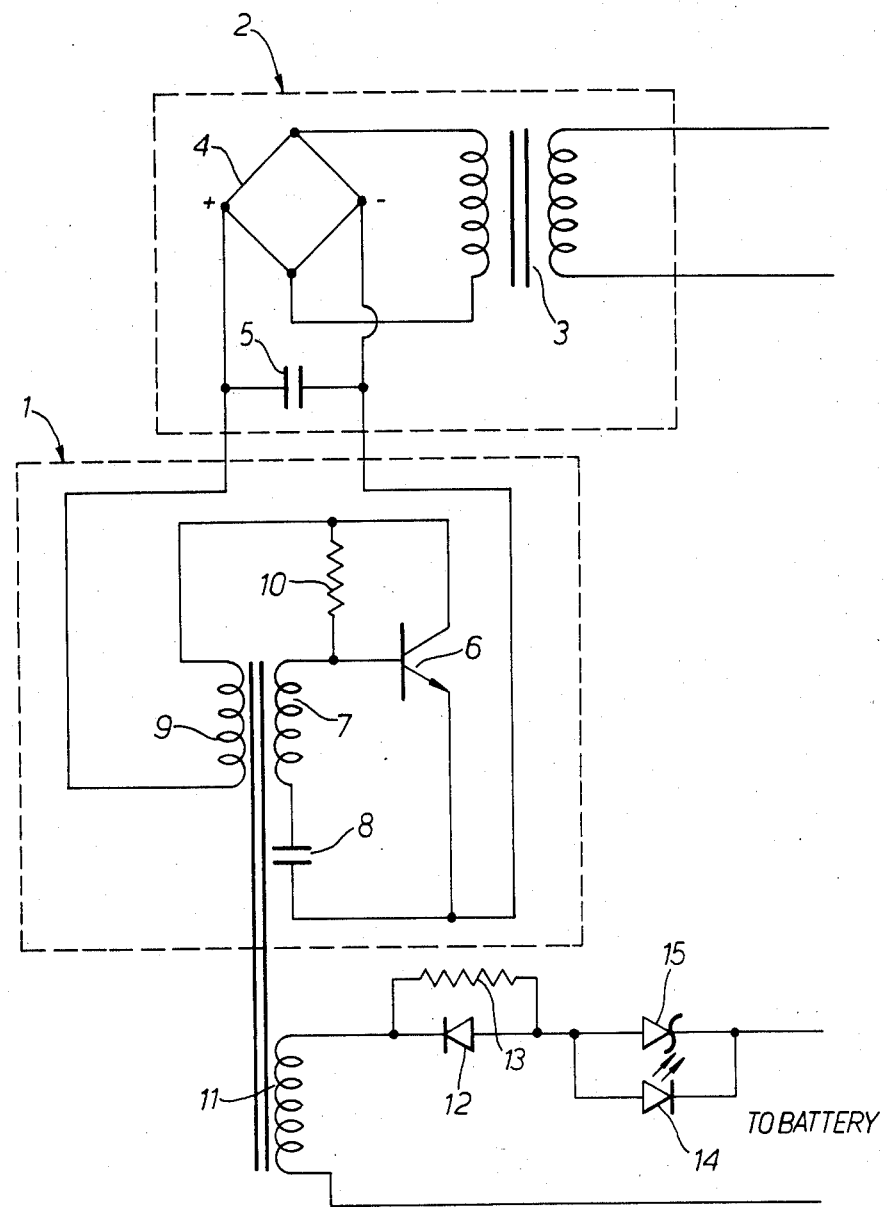

United States Patent [19]
Morris

[11] Patent Number: 4,629,963
[45] Date of Patent: Dec. 16, 1986

[54] DRY CELL BATTERY RE-ACTIVATOR

[75] Inventor: Neil Morris, Worsley, United Kingdom

[73] Assignee: Re-Gen Products Limited, England

[21] Appl. No.: 666,970

[22] Filed: Oct. 31, 1984

[51] Int. Cl.$^4$ .............................................. H02J 7/00
[52] U.S. Cl. ......................................... 320/3; 320/21
[58] Field of Search ...................................... 320/2–6, 320/13, 14, 20, 21

[56] References Cited

U.S. PATENT DOCUMENTS

3,609,502  9/1971  Burkett et al. .................... 320/14 X

FOREIGN PATENT DOCUMENTS

79/01061  12/1979  PCT Int'l Appl. ..................... 320/3
81/01488   5/1981  PCT Int'l Appl. ..................... 320/3
1578922   11/1980  United Kingdom .................. 320/21

OTHER PUBLICATIONS

Graf, ed., Radio Shack New 1978–79 Dictionary of Electronics, pub. by Howard W. Sams, 1978, p. 84.

Primary Examiner—R. J. Hickey
Attorney, Agent, or Firm—Wood, Herron & Evans

[57] ABSTRACT

A dry cell battery re-activator comprising means for producing uni-directional pulses and inductive coupling means whereby the pulses are applied to a closed circuit comprising an inductive element and a battery to be re-activated. The battery to be re-activated has characteristics similar to a leaky capacitor and therefore it forms with the inductive element a heavily damped resonant circuit. Thus each time a pulse is induced in the inductive element damped oscillations occur in the resonant circuit including the battery.

5 Claims, 2 Drawing Figures

DRY CELL BATTERY RE-ACTIVATOR

The present invention relates to a dry cell battery re-activator.

Dry cell batteries are a convenient and safe source of electrical energy. However, they are also expensive in that once discharged they are normally replaced.

It is possible to re-activate dry cell batteries by applying a d.c. current to the battery in the reverse direction to the normal discharge direction of the battery. However, great care must be exercised in doing this, because gases are evolved in the battery during re-activation if the battery is re-activated too fast. These gases accumulate within the battery casing and can result in the battery exploding.

European patent application No. 0 047 183 discloses a re-activator which relies on the impedance of the battery to be re-activated to limit the period for which a cyclically varying d.c. current of 100 Hz is applied to the battery. Thus, as a battery is re-activated from a discharged state the period for which current is applied to it increases progressively as it approaches a fully charged state. The re-activation of the battery at a controlled rate ensures that gases are not evolved in the battery. However, this method of re-activating a battery is slow, especially where the battery is being re-activated from a fully discharged state.

It is an object of the present invention to provide a fast and effective dry cell battery re-activator.

According to the present invention there is provided a dry cell battery re-activator comprising means for producing uni-directional pulses and inductive coupling means whereby the pulses are applied to a closed circuit comprising an inductive element and a battery to be re-activated.

The battery to be re-activated looks like a leaky capacitor and therefore it forms with the inductive element a heavily damped resonant circuit. Thus each time a pulse is induced in the inductive element damped oscillations will occur in the reasonant circuit including the battery. Applicant believes that it is these damped oscillations applied to the battery as a result of each pulse that results in the high efficiency re-activation characteristic of the re-activator according to the present invention.

Preferably the pulses are of high frequency, for example, 100 KHz, and are of relatively short duration.

Preferably the pulses are produced by a blocking oscillator.

Preferably the inductive coupling means comprises two inductively coupled windings, one of which is in the output of the means for producing said pulses and the other of which comprises the inductive element of said closed circuit.

Preferably a blocking diode is provided in the said closed circuit.

Preferably current limiting means are provided in the said closed circuit to limit the current to the battery to be re-activated according to its size.

Figure 2:
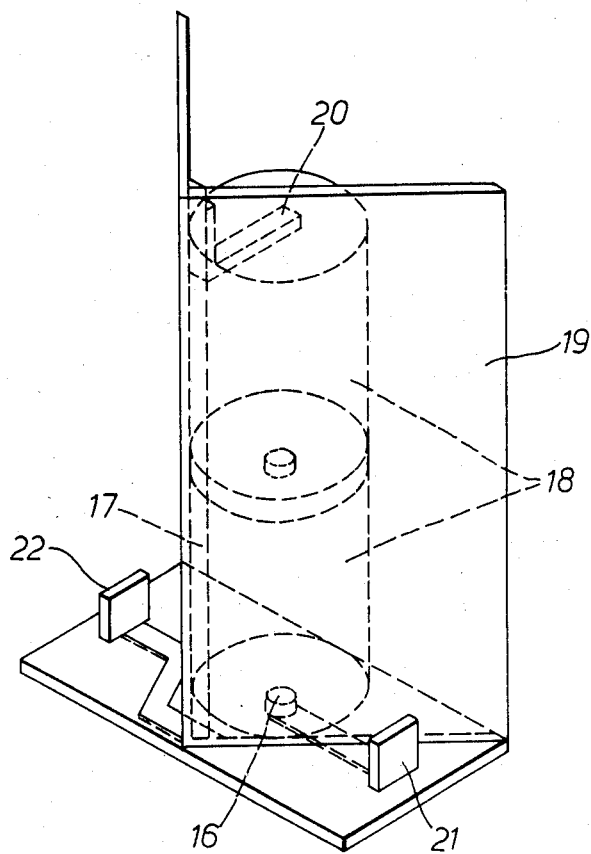

An embodiment of the present invention will now be described, by way of example, with reference to the accompanying drawings, in which:

FIG. 1 is a current diagram of a battery re-activator according to the present invention; and FIG. 2 is a perspective view of a holder adapted to receive various types of battery to be re-activated.

Referring to FIG. 1 of the accompanying drawings, the re-activator comprises a blocking oscillator circuit 1, which is powered by a conventional d.c. power supply 2, consisting of a mains transformer 3, a bridge rectifier 4 and a smoothing capacitor 5.

The oscillator 1 comprises an NPN transistor 6, in the base circuit of which are connected, in series, an inductive winding 7 and a capacitor 8. Connected in the collector circuit of the transistor 6 is a second winding 9, which is inductively coupled to the inductive winding 7 in such a way as to introduce a phase shift of exactly zero between the input, i.e., the base circuit, and output, i.e., the collector circuit, of the transistor 6. Finally, a resistor 10 is connected between the base and the collector of the transistor 6, which provides the transistor 6 with bias.

In operation the oscillator 1 operates intermittently with base bias increasing during oscillation to a point where oscillations stop and then decreasing until oscillation is resumed. Thus, in the output of the oscillator 1, i.e. in the collector circuit of transistor 6, uni-directional pulses are produced, the duration and frequency of which are initially determined by the resistor 10, and the inductive winding 7 (and windings 9 and 11 to which winding 7 is inductively coupled) and capacitor 8 respectively.

The oscillator output, present across winding 9, is inductively coupled to a third winding 11. The winding 11 is of high impedance compared with winding 9 and can have several times the number of turns of winding 9. Thus, it will be appreciated that the amplitude of the pulses induced in the open circuit winding 11 is very high.

A battery to be re-activated (not shown) is connected across the winding 11, via a blocking arrangement consisting of a diode 12, shunted by a high value resistor 13, and an indicator arrangement consisting of an LED 14, shunted by a Zener diode 15. The battery to be re-activated is connected with its positive terminal towards the cathode of diode 12 and its negative terminal towards the free side of winding 11. Where appropriate current limiting means may also be connected in series with the battery.

It will be appreciated that the battery to be re-activated appears across the winding 11 as a leaky capacitor and that accordingly, together with the inductive element of the winding 11, a damped resonant circuit is formed. Thus each time a pulse is induced in the winding 11, a high frequency, damped, alternating voltage appears across the battery. Oscillator 1 is free running at a particular frequency before a battery is connected across winding 11. When a battery (not shown) is connected across winding 11 as described, a resonant tank circuit which is tightly coupled to oscillator 1 results. The frequency of oscillator 1 will therefore be pulled or altered by virtue of winding 11 and the leaky capacitor affect of the battery (not shown). The result is that due to the effective capacitance, the batteries or cells (not shown) to be recharged determine the charging process. Whilst applicant is unclear as to the exact processes which takes place within the battery during the period of each pulse applied thereto, applicant believes that it is the damped oscillations applied to the battery which results in the high efficiency re-activation characteristics of the re-activator according to the present invention.

It will be appreciated that the mark/space ratio, initial frequency and amplitude of the uni-directional pulses may be varied to provide optimum performance of the re-activator for a particular battery. However, the initial frequency of the pulses is preferably high, for example 100 KHz, and the pulses are of relatively short duration.

Whilst the re-activator has been described in relation to one battery it will be appreciated that it may be used to re-activate a number of batteries connected in series.

Referring to FIG. 2 of the accompanying drawings, there is shown a simple battery holder for use with the re-activator according to the present invention. The holder will accommodate, and provide connection to, one battery having positive and negative terminals at opposite ends with respect to one another or a number of batteries arranged end to end, in series.

The holder comprises two conductive connectors 16 and 17, which are isolated from each other and provide connections to the positive and negative terminals of a battery or of a number of batteries connected in series. In FIG. 2 two batteries 18 are shown, stacked one on top of the other, and connected in series. Connector 16 is positioned in the base of the holder and connects with one side of the batteries 18 where they are stacked thereon.

Connector 17 comprises a conductive strip which runs the length of the body 19 of the holder and which is exposed to the side of the body 19 in which the batteries 18 are stacked. The connector 17 is connected to the other side of the batteries 18 by means of connecting member 20, having the form of a right angle. As can be seen from FIG. 2, one side of the right angle rests on the other side of the batteries 18 from that resting on the connector 16 and the other side of the right angle rests up against the conductive strip forming connector 17. The connectors 16 and 17 are in turn connected to terminals 21 and 22, which facilitate connection of the holder with the re-activator. If desired the current limiting means referred to hereinabove may also be mounted on the holder. Indeed a number of current limiting means, each different, may be provided with separate connections to each. The body 19 of the holder comprises two planar elements which are inclined to each other and interconnected to define a corner within which the connector 17 is located. The body 19 is inclined slightly to the vertical so that the batteries 18 and the connecting member 20 lean into the corner, thereby ensuring that the connecting member 20 makes electrical contact both with the uppermost battery 18 and the connector 17.

I claim:

1. A dry cell battery reactivator comprising first and second inductively-coupled circuits, said first circuit including a free running oscillator having a frequency of operation which is determined by said second circuit, said second circuit comprising a tank circuit including inductance means and effective capacitance comprised of at least one cell to be reactivated.

2. The dry cell battery reactivator of claim 1, said free running oscillator comprising a solid state blocking oscillator.

3. The dry cell battery reactivator of claim 2, said blocking oscillator connected to a direct current source via a winding which is inductively coupled to said first and said second circuits.

4. The dry cell battery reactivator of claim 1, said inductance means and said at least one cell serially connected in a loop, said loop including a serially connected diode in parallel with a serially connected resistor.

5. The dry cell battery reactivator of claim 4, said loop further including a serially connected current limiting means.

* * * * *